United States Patent [19]
Ohtsuka et al.

[11] Patent Number: 5,973,056
[45] Date of Patent: Oct. 26, 1999

[54] HOT-MELT ADHESIVE COMPOSITION EXCELLENT IN HEAT RESISTANCE AND COLD RESISTANCE

[75] Inventors: Yoshihiro Ohtsuka, Otake; Kazunori Nakao, Osaka, both of Japan

[73] Assignee: Daicel Chemical Industries, Ltd., Osaka, Japan

[21] Appl. No.: 09/125,002

[22] PCT Filed: Nov. 27, 1997

[86] PCT No.: PCT/JP97/04342

§ 371 Date: Jul. 31, 1998

§ 102(e) Date: Jul. 31, 1998

[87] PCT Pub. No.: WO98/24861

PCT Pub. Date: Jun. 11, 1998

[30] Foreign Application Priority Data

Dec. 2, 1996 [JP] Japan .................................. 8-321506

[51] Int. Cl.⁶ .......................... C08L 91/06; C08L 53/02; C08L 57/02
[52] U.S. Cl. ......................... 524/487; 524/487; 524/505; 524/499
[58] Field of Search ..................... 524/487, 489, 524/505, 270, 499; 525/98

[56] References Cited

U.S. PATENT DOCUMENTS 5,516,824 5/1996 Masse et al. .............................. 524/270

FOREIGN PATENT DOCUMENTS

| | | |
|---|---|---|
| 0479311 | 4/1992 | European Pat. Off. . |
| 0516203 | 12/1992 | European Pat. Off. . |
| 0632074 | 1/1995 | European Pat. Off. . |
| 0658603 | 6/1995 | European Pat. Off. . |
| 8-73521 | 3/1996 | Japan . |
| 8-81616 | 3/1996 | Japan . |
| 08311426 | 11/1996 | Japan . |
| WO95/30721 | 11/1995 | WIPO . |

*Primary Examiner*—Peter A. Szekely
*Attorney, Agent, or Firm*—Sherman and Shalloway

[57] ABSTRACT

The present invention provides a hot melt adhesive composition comprising an epoxy-modified block copolymer obtained by epoxidizing a carbon-carbon double bond of a conjugate diene component in a block copolymer having a polymer block (A) comprising mainly a vinyl aromatic compound and a polymer block (B) comprising mainly a conjugate diene compound in one molecule, a paraffin wax having a melting point of 40 to 100° C., a tackifier and an antioxidant. The hot melt adhesive composition of the present invention is well compatible with a paraffin wax and a tackifier because it has an epoxy group which is a polar group in a molecule. Further, the hot melt adhesive composition has excellent heat resistance and cold resistance because of a combination of the epoxy-modified bloc copolymer as a base polymer with paraffin wax, and while the melt viscosity is low, the heat resistance is high.

22 Claims, No Drawings

“5,973,056”

HOT-MELT ADHESIVE COMPOSITION EXCELLENT IN HEAT RESISTANCE AND COLD RESISTANCE

TECHNICAL FIELD

The present invention relates to a hot melt adhesive composition using a block copolymer having a specific epoxy-modified structure, specifically to a hot melt adhesive composition excellent in a heat resistance and a cold resistance.

BACKGROUND ART

A hot melt adhesive is a non-solvent type adhesive which has a solid content of 100% at room temperature. It is heated and molten when used and adhered and applied on a matter to be adhered, followed by cooling to solidify it, whereby the adhesive strength is revealed. This hot melt adhesive has less risks of environmental pollution and a fire because of a non-solvent type and has such many advantages that setting time for adhesion can be shortened and handling is easy. Accordingly, it is used widely in various fields such as bookbinding, packaging and woodworking as applicators spread rapidly.

Hot melt adhesives are usually composed by adding various waxes as a tackifier and a viscosity control agent to thermoplastic resins such as, for example, olefin base copolymers which are base polymers. Generally used as the base polymers described above are ethylene-vinyl acetate copolymers and ethylene-acrylate copolymers out of the olefin base copolymers in terms of flexibility and costs. Further, widely used as the tackifier are natural resins and derivatives thereof such as rosin base resins and terpene base resins, and petroleum resins. Petroleum waxes, mineral waxes such as coal, and low molecular weight polyethylene waxes are used widely as the waxes.

Hot melt adhesives are widely used in the respective fields of automobiles, packing containers and structural materials, but the sufficiently high adhesive properties are not displayed to base materials comprising olefin base copolymers having less polarity as base polymers and base materials provided with surface coatings with silicon and wax. On the other hand, hot melt adhesives using thermoplastic rubber are excellent in a heat resistance and a cold resistance but have a high viscosity, so that specific applicators have to be used.

Usually, required to hot melt adhesives are many characteristics such as (1) low melt viscosity in order to improve workability and a wetting property to base materials, (2) high cold resistance and flexibility as well as a high adhesive strength, (3) high heat resistance in order to allow an adhesive strength to be revealed even at high temperatures, (4) short setting time and (5) high heat stability. However, if the melt viscosity is reduced, the heat resistance is lowered. On the other hand, if the heat resistance is elevated, not only the melt viscosity grows large but also the cold resistance and the flexibility are reduced. Thus, plural conflicting characteristics are required in hot melt adhesives. In order to allow these characteristics to be compatible with each other, the structural components and the composition proportions have been investigated, but it is difficult to allow the cold resistance to be compatible with the heat resistance. An object of the present invention is to provide a hot melt adhesive composition which is excellent in a heat resistance and a cold resistance.

DISCLOSURE OF INVENTION

The pre sent inventors have found that the problems described above can be solved by a composition obtained by blending an epoxy-modified block copolymer having a specific structure with a paraffin wax, a tackifier and an antioxidant and thus have completed the present invention.

That is, the present invention provides a hot melt adhesive composition comprising an epoxy-modified block copolymer obtained by epoxidizing a carbon-carbon double bond of a conjugate diene component in a block copolymer having a polymer block (A) comprising mainly a vinyl aromatic compound and a polymer block (B) comprising mainly a conjugate diene compound in one molecule, a paraffin wax having a melting point of 40 to 100° C., a tackifier and an antioxidant.

BEST MODE FOR CARRYING OUT THE INVENTION

In the epoxy-modified block copolymer used in the present invention, examples of the vinyl aromatic compound constituting the polymer block (A) comprising mainly the vinyl aromatic compound include, for example, styrene, α-methylstyrene, vinyltoluene, p-tertiary-butylstyrene, divinylbenzene, p-methylstyrene and 1,1-diphenylstyrene. Among them, styrene is preferred. In the present invention, they can be used alone or in combination of two or more kinds thereof.

Further, examples of the conjugate diene compound constituting the polymer block (B) comprising mainly the conjugate diene compound include butadiene, isoprene, 1,3-pentadiene, 2,3-dimethyl-1,3-butadiene, 3-butyl-1,3-octadiene and phenyl-1,3-butadiene. Among them, butadiene and isoprene are preferred. In the present invention, they can be used alone or in combination of two or more kinds thereof.

The block copolymer of the present invention comprises the polymer block (A) comprising mainly the vinyl aromatic compound and the polymer block (B) comprising mainly the conjugate diene compound. A copolymerization ratio (weight ratio) of the vinyl aromatic compound to the conjugate diene compound is preferably 5/95 to 70/30, particularly preferably 10/90 to 60/40. The block copolymer has a number-average molecular weight falling preferably in a range of 5,000 to 600,000, particularly preferably 10,000 to 500,000. The molecular weight distribution [weight-average molecular weight (Mw)/number-average molecular weight (Mn) ratio] is preferably 10 or less in terms of (Mw)/(Mn). Further, the block copolymer may have a linear, branched or radial molecular structure or an optionally combined structure thereof, and examples thereof include, for example, vinyl aromatic compound-conjugate diene compound block polymers having structures of, for example, A-B-A, B-A-A-B, (A-B-)$_4$Si and A-B-A-B-A. Incidentally, an unsaturated bond of the conjugate diene compound of the block polymer may partially be hydrogenated.

A production method for the block copolymer used in the present invention may be any methods as long as the block copolymer has the structures described above. Vinyl aromatic compound-conjugate diene compound block copolymers can be produced in inert solvents with lithium catalysts and the like by methods described in, for example, Japanese Examined Patent Publication No. 40-23798, Japanese Examined Patent Publication No. 43-17979, Japanese Examined Patent Publication No. 46-32415 and Japanese Examined Patent Publication No. 56-28925. Further, partially hydrogenated copolymers can be synthesized by hydrogenating in inert solvents in the presence of hydrogenation catalysts by methods described in Japanese Examined Patent Publication No. 42-8704, Japanese Examined Patent Publication No. 43-6636 and Japanese Patent Application Laid-Open No. 59-133203.

The epoxy-modified block copolymers used in the present invention are produced by epoxidizing the block copolymers described above. Epoxidation can be carried out by reacting the block copolymers described above with epoxidizing agents such as hydroperoxides and peracetic acid in inert solvents. An amount of the epoxidizing agents is not strictly restricted, and the optimum amounts in the respective cases can be selected depending on variable factors such as the respective oxidizing agents used, the desired epoxidation degrees and the respective block copolymers used.

Inert solvents can be used for the purposes of reducing the viscosity of the raw materials and stabilizing the epoxidizing agents by dilution, and aromatic compounds, ethers and esters can be used in the case of peracetic acid. Particularly preferred solvents are hexane, cyclohexane, toluene, benzene, ethyl acetate, carbon tetrachloride and chloroform.

The epoxidation reaction condition is not strictly restricted, and the usable reaction temperature area can suitably be selected depending on a reactivity of the epoxidizing agents used. For example, when peracetic aid is used, temperatures of 0 to 70° C. are preferred. The reaction is slow at temperatures of 0° C. or lower, and temperatures exceeding 70° C. cause a decomposition of peracetic acid. Further, in a tertiary butyl hydroperoxide/molybdenum dioxide diacetyl acetate system which is one example of hydroperoxides, temperatures of 20 to 150° C. are preferred because of the same reason. The reaction compounds do not have to be specifically handled. For example, the mixture may be stirred for 2 to 10 hours.

The resulting epoxy-modified block copolymer can be isolated by suitable methods, for example, a method in which a polymer is precipitated by adding a poor solvent, a method in which a polymer is thrown into hot water with stirring to evaporate and remove a solvent and a direct solvent-removing method.

In the present invention, an epoxy equivalent (the number of gram of a compound containing 1 g equivalent of an epoxy group) of the epoxy-modified block copolymer is obtained by titrating the polymer with 0.1 normal of hydrobromic acid and calculating from epoxy equivalent=(1,000× weight (g) of the epoxy-modified block copolymer)/(titrated amount (ml) of hydrobromic acid x factor of hydrobromic acid).

In the present invention, an epoxy equivalent of the epoxy-modified block copolymer is preferably 200 to 5,000, particularly preferably 250 to 1,500. If the epoxy equivalent is less than 200, the epoxy-modified block copolymer is inferior in fluidity and degraded in workability. On the other hand, the epoxy equivalent exceeding 5,000 lowers the adhesive property in a certain case.

The present invention is characterized by combining the epoxy-modified block copolymer described above with a paraffin wax. The paraffin wax has a melting point of 40 to 100° C., preferably 60 to 85° C. and more preferably 68 to 80° C. To be specific, paraffin waxes having a melting point of, for example, 68 to 80° C., preferably 68 to 78° C. and particularly preferably 68 to 76° C. can be used. If a melting point of the paraffin wax is lower than 40° C., the heat resistance is reduced. On the other hand, the melting point exceeding 100° C. is liable to lower the flexibility and the cold resistance. In the present invention, they can be used alone or in combination of two or more kinds thereof.

Further, the paraffin wax has a number-average molecular weight of 200 to 660, preferably 300 to 630 and more preferably 400 to 600. The paraffin wax has a carbon number of 21 to 70, preferably 25 to 60 and particularly preferably 30 to 40. The paraffin wax may contain branched components such as iso-paraffin, and cyclic components as long as it contains n-paraffin as a principal component. The use of such paraffin wax can elevate the heat resistant adhesive property and allow the high adhesive strength to be revealed even at high temperatures. Further, the workability and the wetting property to a base material are raised, and the flexibility, the cold resistance and the heat stability are not damaged.

The paraffin wax is compounded in an amount of 50 to 150 parts by weight, preferably 75 to 125 parts by weight per 100 parts by weight of the epoxy-modified block copolymer which is a base polymer. The amount of less than 50 parts by weight allows the melt viscosity to remain still high and reduces the workability and the wetting property to a base material. On the other hand, the amount exceeding 150 parts by weight reduces the adhesive strength. If the paraffin wax is used in an amount of 50 to 150 parts by weight, the adhesive property can be inhibited from being revealed at room temperature while securing the sufficiently high adhesive strength. In addition, the melt viscosity is lowered, and the workability and the wetting property are good.

The composition of the present invention contains a tackifier. This improves the adhesive strength and raises the initial adhesive strength. The tackifier includes terpene base resins, coumarone base resins, petroleum resins, hydrogenated petroleum resins, styrene resins, phenol resins and rosin base resins.

The terpene base resins include terpene base resins which are terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

The petroleum resins include, for example, aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homo- or copolymers of cyclopentadiene. The petroleum resins are polymers using fractions having a carbon number of 5 to 9 as main components, and hydrogenated petroleum resins such as hydrogenated cyclopentadiene resins can also be used as the tackifier in the present invention.

The styrene base resins include homopolymers which are low molecular weight polymers comprising styrene as a principal component, and copolymers of styrene with, for example, a-methylstyrene, vinyltoluene and butadiene rubber.

The phenol base resins include reaction products of phenols such as phenol, cresol, xylenol, resorcinol, p-tert-butylphenol and p-phenylphenol with aldehydes such as formaldehyde, acetaldehyde and furfural, and rosin-modified phenol resins.

The rosin base reins include rosins such as gum rosin and wood rosin, and derivatives thereof (for example, disproportionated rosin, hydrogenated rosin, dehydrogenated rosin, rosin esters such as rosin glycerin ester and rosin pentaerythritol ester, maleic acid adducts of resins and rosin metal salts).

The tackifiers used in the present invention are preferably the petroleum resins and the hydrogenated petroleum resins from the viewpoints of a compatibility and an adhesive property.

The tackifier used in the present invention has a softening point of 80 to 150° C., preferably 100 to 145° C. and particularly preferably 120 to 140° C. If the tackifier has a softening point of lower than 80° C., the anti-thermal creep property is inferior, and the setting time is liable to be extended. On the other hand, the softening point exceeding 150° C. is liable to reduce the compatibility and the heat resistance.

A use amount of the tackifier is preferably 100 to 300 parts by weight, particularly preferably 120 to 240 parts by weight per 100 parts by weight of the base polymer. If the use amount is less than 100 parts by weight per 100 parts by weight of the base polymer, the initial adhesive property, the cold resistance and the setting property are reduced. On the other hand, if the use amount exceeds 300 parts by weight, the adhesive strength is reduced as the cohesive strength is reduced.

The composition of the present invention contains an antioxidant particularly in order to raise the heat stability. The antioxidant capable of being used includes compounds described in "Practical Handbook of Additives for Plastics and Rubber" (published by Chemical Ind. Co., Ltd. in 1970) p. 147 to 304 and p. 1041 to 1054.

They include, for example, phenol base antioxidants such as 2,6-di-tert-butyl-p-cresol, 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2'-thiobis(4-methyl-6-tert-butylphenol), stearyl-β-(3,5-di-tert-butyl-4-hydroxyphenol)propionate, tetrakis[methylene-3-(3,5-di-tert-butyl-4-hydroxyphenyl)propionate]methane, triethylene glycol, bis[3-(3-tert-butyl-4-hydroxy-5-methylphenyl)]propionate, 1,3,5-triethyl-2,4,6-tris(3,5-di-tert-butyl-4-hydroxybenzyl)benzene and 1,1,3-tris(2-methyl-5-tert-butylphenol)butane; amine base antioxidants such as phenyl-α-naphthylamine, phenyl-β-naphthylamine, N-phenyl-N'-cyclohexyl-p-phenylenediamine and N-isopropyl-N'-phenyl-p-phenylenediamine; phosphorus base antioxidants represented by triisodecyl phosphite and 2,2'-methylenebis(4,6-di-tert-butylphenyl)octyl phosphite; sulfur-containing antioxidants represented by 2,2'-thiobis(4-methyl-6-tert-butylphenol); and hydroquinone antioxidants represented by 2,5-di-tert-amylhydroquinone. In the present invention, the phenol base antioxidants are particularly preferably used.

The antioxidants used in the present invention are added preferably in an amount of 5 to 15 parts by weight per 100 parts by weight of the base polymer. If an addition amount of these antioxidants is less than 5 parts by weight per 100 parts by weight of the base polymer, the thermal degradation and the heat stability are not improved. On the other hand, if the addition amount exceeds 15 parts by weight per 100 parts by weight of the base polymer, the anti-thermal creep property is damaged, and the cost rises from an economical point of view. Accordingly, it is not preferred. These antioxidants may be alone or in combination of two or more kinds thereof.

Further, other additives, for example, lubricants, pigments, dyes, inorganic fillers, perfumes, UV absorbers, oils and the like can be added to the hot melt adhesive of the present invention as long as the object of the present invention is not damaged.

Olefin base copolymers can further be added to the hot melt adhesive of the present invention as long as the object of the present invention is not damaged. The olefin base copolymers include a high density polyethylene, intermediate density polyethylene, low density polyethylene and copolymers of ethylene with other α-olefins; polypropylene and copolymers of propylene with other α-olefins; polyolefins or oligomers such as polybutene and poly-4-methylpentene-1; ethylene-vinyl acetate copolymers, butyl rubber, butadiene rubber, propylene-butene copolymers, ethylene-acrylic ester copolymers and ethylene-methacrylic ester copolymers. These polymers may be added alone or in combination of two or more kinds thereof.

The hot melt adhesive composition of the present invention has preferably a melt viscosity of 500 to 3,500 cps in heating at 180° C. If the melt viscosity exceeds 3,500 cps, the workability is inferior. On the other hand, the melt viscosity of lower than 500 cps makes it difficult to satisfy a balance of the heat resistance against the cold resistance.

The hot melt adhesive composition of the present invention can be produced by conventional methods, for example, by heating, melting and mixing the respective components. Heating for melting and mixing is usually carried out at atmospheric pressure in many cases but may be carried out under pressure or reduced pressure. Heating for melting and mixing is influenced by the high melting point components in a certain case and carried out usually at temperatures falling in a range of 70 to 300° C., preferably 80 to 250° C. An apparatus for heating, melting and mixing is not specifically restricted as long as heating and mixing are possible. Usually, tanks equipped with stirrers are used in many cases. Further, an intensive mixer, a banbury mixer, a super mixer and a Honschell mixer can be used. The respective components of the hot melt adhesive composition are heated for melting and mixing by means of an extruding machine equipped with a screw, whereby the hot melt adhesive composition is obtained. Further, the composition which is heated for melting and mixing is excluded from a die and cooled to obtain the hot melt adhesive having a desired shape such as a pellet, bar and tape. Further, the pellet-, film-, tape- or string-shaped hot melt adhesive can be powdered by known methods to prepare a pulverulent hot melt adhesive.

The hot melt adhesive comprising the hot melt adhesive composition of the present invention is heated and molten and then applied on a matter to be adhered by means of a hot melt applicator such as a nozzle type or roller type coater. Further, the film-shaped or powdered hot melt adhesive can be interposed between matters to be adhered and heat-pressed for adhesion.

EXAMPLES

The present invention shall further be explained below with reference to examples but shall not be restricted to them. In the following descriptions, parts and percentages mean parts by weight and % by weight, respectively.

Example 1

A jacket-fitted reactor equipped with a stirrer, a reflux condenser and a thermometer was charged with 300 g of a polystyrene-polyisoprene-polystyrene block copolymer (trade name "SIS5000P" manufactured by Japan Synthetic Rubber Co., Ltd., styrene content: 16% by weight) and 900 g of ethyl acetate to dissolve them. Then, 93 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 920. Molten and mixed were 30 parts by weight of this epoxy-modified block copolymer, 40 parts by weight of an aliphatic petroleum resin ("Alcon M-135" manufactured by Arakawa Chemical Co., Ltd., softening point: 135° C.), 30 parts by weight of a paraffin wax ("Paraffin HNP-9" manufactured by Nippon Seiro Co., Ltd., melting point: 75° C.) and 2.0 parts by weight of an antioxidant ("Irganox 1010" manufactured by Ciba Geigy Co., Ltd., phenol base) at temperatures of 140 to 180° C. at which hardening reaction was not caused by means of a kneader device, whereby a hot melt adhesive composition was obtained.

Example 2

A jacket-fitted reactor equipped with a stirrer, a reflux condenser and a thermometer was charged with 300 g of a polystyrene-polyisoprene-polystyrene block copolymer (trade name "Clayton D1107" manufactured by Shell Chemical Co., Ltd., styrene content: 14% by weight) and 900 g of ethyl acetate to dissolve them. Then, 285 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 320. Molten and mixed were 20 parts by weight of this epoxy-modified block copolymer, 60 parts by weight of an aliphatic petroleum resin ("Alcon P-140" manufactured by Arakawa Chemical Co., Ltd., softening point: 140° C.), 20 parts by weight of a paraffin wax ("Paraffin 155F" manufactured by Nippon Seiro Co., Ltd., melting point: 69° C.) and 3.0 parts by weight of the antioxidant ("Irganox 1010" manufactured by Ciba Geigy Co., Ltd.) at temperatures of 140 to 180° C. at which hardening reaction was not caused by means of a kneader device, whereby a hot melt adhesive composition was obtained.

Example 3

A jacket-fitted reactor equipped with a stirrer, a reflux condenser and a thermometer was charged with 300 g of a polystyrene-polyisoprene-polystyrene block copolymer (trade name "Clayton D1112" manufactured by Shell Chemical Co., Ltd., styrene content: 15% by weight) and 900 g of ethyl acetate to dissolve them. Then, 190 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 470. Molten and mixed were 30 parts by weight of this epoxy-modified block copolymer, 30 parts by weight of an aliphatic petroleum resin ("Alcon M-90" manufactured by Arakawa Chemical Co., Ltd., softening point: 90° C.), 40 parts by weight of the paraffin wax ("Paraffin 155F" manufactured by Nippon Seiro Co., Ltd.) and 1.5 part by weight of the antioxidant ("Irganox 10101" manufactured by Ciba Geigy Co., Ltd.) at temperatures of 140 to 180° C. at which hardening reaction was not caused by means of a kneader device, whereby a hot melt adhesive composition was obtained.

Example 4

A jacket-fitted reactor equipped with a stirrer, a reflux condenser and a thermometer was charged with 300 g of a polystyrene-polyisoprene-polystyrene block copolymer (trade name "Clayton D1117" manufactured by Shell Chemical Co., Ltd., styrene content: 17% by weight) and 900 g of ethyl acetate to dissolve them. Then, 95 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 941. Molten and mixed were 40 parts by weight of this epoxy-modified block copolymer, 40 parts by weight of an aliphatic petroleum resin ("Alcon M-115" manufactured by Arakawa Chemical Co., Ltd., softening point: 115° C.), 20 parts by weight of the paraffin wax ("Paraffin HNP-9" manufactured by Nippon Seiro Co., Ltd.) and 6 parts by weight of the antioxidant ("Irganox 1010" manufactured by Ciba Geigy Co., Ltd.) at temperatures of 140 to 180° C. at which hardening reaction was not caused by means of a kneader device, whereby a hot melt adhesive composition was obtained.

Comparative Example 1

Molten and mixed were 30 parts by weight of the polystyrene-polyisoprene-polystyrene block copolymer (trade name "SIS5000P" manufactured by Japan Synthetic Rubber Co., Ltd.), 40 parts by weight of the aliphatic petroleum resin ("Alcon M-135" manufactured by Arakawa Chemical Co., Ltd.), 30 parts by weight of the paraffin wax ("Paraffin HNP-9" manufactured by Nippon Seiro Co., Ltd.) and 2.0 parts by weight of the antioxidant ("Irganox 1010" manufactured by Ciba Geigy Co., Ltd.) at temperatures of 140 to 180° C. at which hardening reaction was not caused by means of a kneader device, whereby a hot melt adhesive composition was obtained.

Comparative Example 2

Molten and mixed were 35 parts by weight of an ethylene-vinyl acetate copolymer ("Ultracene 680" manufactured by Toso Co., Ltd., VAc=24%, MI=160), 40 parts by weight of the aliphatic petroleum resin ("Alcon M-135" manufactured by Arakawa Chemical Co., Ltd.), 25 parts by weight of the paraffin wax ("Paraffin HNP-9" manufactured by Nippon Seiro Co., Ltd.) and 2.0 parts by weight of an antioxidant ("Adeka Stab HP-10" manufactured by Asahi Denka Co., Ltd., phenol base) at temperatures of 100 to 120° C. at which hardening reaction was not caused by means of a kneader device, whereby a hot melt adhesive composition was obtained.

Comparative Example 3

A jacket-fitted reactor equipped with a stirrer, a reflux condenser and a thermometer was charged with 300 g of a polystyrene-polybutadiene-polystyrene block copolymer (trade name "TR-2000" manufactured by Japan Synthetic Rubber Co., Ltd., styrene content: 40% by weight) and 900 g of ethyl acetate to dissolve them. Then, 169 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 470. Molten and mixed were 30 parts by weight of this epoxy-modified block copolymer, 40 parts by weight of the aliphatic petroleum resin ("Alcon M-135" manufactured by Arakawa Chemical Co., Ltd.), 20 parts by weight of a process oil (trade name "Shell Flex 371N" manufactured by Shell Chemical Co., Ltd., liquid) and 2.0 parts by weight of an antioxidant ("Adeka Stab AO-412S" manufactured by Asahi Denka Co., Ltd.) at temperatures of 140 to 180° C. at which hardening reaction was not caused by means of a kneader device, whereby a hot melt adhesive composition was obtained.

Comparative Example 4

A jacket-fitted reactor equipped with a stirrer, a reflux condenser and a thermometer was charged with 300 g of the polystyrene-polyisoprene-polystyrene block copolymer (trade name "SIS5000P" manufactured by Japan Synthetic Rubber Co., Ltd.) and 900 g of ethyl acetate to dissolve them. Then, 93 g of a 30 weight % ethyl acetate solution of peracetic acid was continuously added dropwise to carry out epoxidation reaction with stirring at 40° C. for 3 hours. The reaction solution was cooled to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 920. Molten and mixed were 30 parts by weight of this epoxy-modified block copolymer, 10 parts by weight of a dibasic acid-modified rosin ester (trade name "Pentarin 255" manufactured by Rika Hercules Co., Ltd., softening point: 161° C.) and 60 parts by weight of a paraffin wax ("Paraffin 140F" manufactured by Nippon Seiro Co., Ltd., melting point: 61° C.) at temperatures of 140 to 180° C. at which hardening reaction was not caused by means of a kneader device, whereby a hot melt adhesive composition was obtained.

Comparative Example 5

A jacket-fitted reactor equipped with a stirrer, a reflux condenser and a thermometer was charged with 300 g of the polystyrene-polyisoprene-polystyrene block copolymer (trade name "Clayton D1112" manufactured by Shell Chemical Co., Ltd.) and 900 g of ethyl acetate to dissolve them. Then, 285 g of a 30 weight % ethyl acetate solution of peracetic acid was continuously added dropwise to carry out epoxidation reaction with stirring at 40° C. for 3 hours. The reaction solution was brought back to room temperature and taken out of the reactor. A large amount of methanol was added to the reaction solution so as to precipitate a polymer, which was filtered off and then washed with water and dried, whereby an epoxy-modified block copolymer was obtained. The epoxy-modified block copolymer thus obtained had an epoxy equivalent of 320. Molten and mixed were 20 parts by weight of this epoxy-modified block copolymer, 75 parts by weight of an aliphatic petroleum resin ("Alcon M-100" manufactured by Arakawa Chemical Co., Ltd., softening point: 100° C.), 5 parts by weight of a polyethylene wax ("Neo Wax L" manufactured by Yahara Chemical Co., Ltd., softening point: 110° C.) and 6.0 parts by weight of the antioxidant ("Irganox 1010" manufactured by Ciba Geigy Co., Ltd.) at temperatures of 140 to 180° C. at which hardening reaction was not caused by means of a kneader device, whereby a hot melt adhesive composition was obtained.

The hot melt adhesive compositions obtained in Examples 1 to 4 and Comparative Examples 1 to 5 each described above were measured for the following items. The results thereof are shown in Table-1 and Table-2.

Measured items and measuring conditions:

(1) Heat melting condition:

A heat melting property at a temperature of 180° C. was evaluated according to the following criteria:

∘: sufficiently compatible with each other and no phase separation is caused

Δ: a little phase separation is caused

×: not compatible (2) Melt viscosity (cps/180° C.)

(3) Open time

The hot melt adhesive composition was applied on a corrugated board B flute (220 g/m$^2$) of a K liner in the form of a line under conditions of an applying temperature of 180±2° C. and a coated amount of 3 g/m. The corrugated boards were stuck together in different time elapsed after applying the hot melt adhesive composition and pressed at a load of 2 kg for 2 seconds, followed by separating them. This operation was carried out for five test pieces, and the open time was determined by time elapsed until a material breaking rate reached 80% or more in 4 or more test pieces.

(4) Setting time:

The hot melt adhesive composition was applied on a corrugated board B flute (220 g/m$^2$) of a K liner in the form of a line under conditions of an applying temperature of 180±2° C. and a coated amount of 3 g/m. The corrugated boards were stuck together in an open time of 2 seconds and pressed at a load of 2 kg, whereby five test pieces were prepared. The setting time was determined by time elapsed until a material breaking rate reached 80% or more in 4 or more test pieces of 5 test pieces when separation was carried out changing time elapsed from pressing.

(5) Heat resistant temperature

The hot melt adhesive composition was applied on a kraft paper in the form of a line having a width of 2.5 mm under conditions of an applying temperature of 180±2° C. and a coated amount of 3 g/m. The kraft paper was stuck together with a kraft paper in an open time of 2 seconds, and they were pressed at a load of 2 kg for 2 seconds to prepare a test piece. This operation was repeated to prepare five test pieces.

After leaving the test piece for standing at room temperature for 12 hours or longer, it was left for standing in a constant temperature bath of 40° C. for 20 minutes. Then, a load of 100 gf/25 mm was applied on one paper of the test piece, and the heat resistant temperature was determined by a temperature at which when the temperature was elevated at a rate of 1° C./minute, the adhesive layer was broken and the kraft paper fell. A number shown in the table is an average value of the five test pieces.

(6) Cold resistance

The hot melt adhesive composition was applied on a kraft paper in the form of a line having a width of 2.5 mm under conditions of an applying temperature of 180±2° C. and a coated amount of 3 g/m. The kraft paper was stuck together with a kraft paper in an open time of 2 seconds, and they were pressed at a load of 2 kg for 2 seconds to prepare a test piece. This operation was repeated to prepare five test pieces.

After leaving the test piece for standing at room temperature for 12 hours or longer, it was left for standing in an atmosphere of −20° C. for one hour, and the mark ○ was given when a material breaking rate reached 50% or more in 4 or more test pieces.

(7) Heat stability

The hot melt adhesive composition was put in a vessel (100 ml) and heated at a temperature of 180° C. for 72 hours to evaluate formation of carbides and occurrence of phase separation based the following criteria:

○: carbides and phase separation are not produced
Δ: carbides and phase separation are slightly produced
×: carbides and phase separation are markedly produced

TABLE 1

| Measured items | Example | | | |
|---|---|---|---|---|
| | 1 | 2 | 3 | 4 |
| Heat melting condition | ○ | ○ | ○ | ○ |
| Melt viscosity | 1750 | 850 | 550 | 2850 |
| Open time (second) | 24 | 3 | 2 | 30 |
| Setting time (second) | 5 | 1 | 1 | 7 |
| Heat resistant temperature | 81° C. | 74° C. | 72° C. | 83° C. |
| Cold resistance | ○ | ○ | ○ | ○ |
| Heat stability | ○ | ○ | ○ | ○ |

TABLE 2

| Measured items | Comparative Example | | | | |
|---|---|---|---|---|---|
| | 1 | 2 | 3 | 4 | 5 |
| Heat melting condition | × | ○ | ○ | ○ | Δ |
| Melt viscosity | — | 1300 | 8800 | 120 | 9600 |
| Open time (second) | — | 8 | 50 | 1 | 1 |
| Setting time (second) | — | 3 | 25 | 1 | 1 |
| Heat resistant Temperature | — | 71° C. | 48° C. | 70° C. | 65° C. |
| Cold resistance | — | × | ○ | × | × |
| Heat stability | — | ○ | ○ | × | ○ |

Industrial Applicability

The hot melt adhesive composition of the present invention is well compatible with a paraffin wax and a tackifier because it has an epoxy group which is a polar group in a molecule. Further, the hot melt adhesive composition has excellent heat resistance and cold resistance because of a combination of the epoxy-modified block copolymer as a base polymer with a paraffin wax, and while the melt viscosity is low, the heat resistance is high. The use of petroleum resins as the tackifier provides the hot melt adhesive composition which is high in an adhesive strength, a heat resistance and a setting property.

We claim:

1. A hot melt adhesive composition comprising an epoxy-modified block copolymer obtained by epoxidizing a carbon—carbon double bond of a conjugate diene component in a block copolymer having a polymer block (A) comprising mainly a vinyl aromatic compound and a polymer block (B) comprising mainly a conjugate diene compound in one molecule, a paraffin wax having a melting point of 40 to 100° C., a tackifier and an antioxidant.

2. The hot melt adhesive composition as described in claim 1, wherein the epoxy-modified block copolymer has an epoxy equivalent of 200 to 5,000.

3. The hot melt adhesive composition as described in claim 2, wherein the paraffin wax having a number-average molecular weight of 200 to 660 is added in an amount of 50 to 150 parts by weight per 100 parts by weight of the epoxy-modified block copolymer.

4. The hot melt adhesive composition as described in claim 3, wherein the tackifier having a softening point of 80 to 150° C. is added in an amount of 100 to 300 parts by weight per 100 parts by weight of the epoxy-modified block copolymer.

5. The hot melt adhesive composition as described in claim 4, wherein the tackifier is a hydrogenated petroleum resin or a petroleum resin.

6. The hot melt adhesive composition as described in claim 4, wherein the antioxidant is added in an amount of 5 to 15 parts by weight per 100 parts by weight of the epoxy-modified block copolymer.

7. The hot melt adhesive composition as described in claim 6, wherein the antioxidant is a phenol base antioxidant.

8. The hot melt adhesive composition as described in claim 1, wherein the paraffin wax having a number-average molecular weight of 200 to 660 is added in an amount of 50 to 150 parts by weight per 100 parts by weight of the epoxy-modified block copolymer.

9. The hot melt adhesive composition as described in claim 8, wherein the tackifier having a softening point of 80 to 150° C. is added in an amount of 100 to 300 parts by weight per 100 parts by weight of the epoxy-modified block copolymer.

10. The hot melt adhesive composition as described in claim 9, wherein the tackifier is a hydrogenated petroleum resin or a petroleum resin.

11. The hot melt adhesive composition as described in claim 9, wherein the antioxidant is added in an amount of 5 to 15 parts by weight per 100 parts by weight of the epoxy-modified block copolymer.

12. The hot melt adhesive composition as described in claim 11, wherein the antioxidant is a phenol base antioxidant.

13. The hot melt adhesive composition as described in claim 1, wherein the tackifier having a softening point of 80 to 150° C. is added in an amount of 100 to 300 parts by weight per 100 parts by weight of the epoxy-modified block copolymer.

14. The hot melt adhesive composition as described in claim 13, wherein the tackifier is a hydrogenated petroleum resin or a petroleum resin.

15. The hot melt adhesive composition as described in claim 13, wherein the antioxidant is added in an amount of 5 to 15 parts by weight per 100 parts by weight of the epoxy-modified block copolymer.

16. The hot melt adhesive composition as described in claim 15, wherein the antioxidant is a phenol base antioxidant.

17. The hot melt adhesive composition as described in claim 1, wherein the antioxidant is added in an amount of 5 to 15 parts by weight per 100 parts by weight of the epoxy-modified block copolymer.

18. The hot melt adhesive composition as described in claim 17, wherein the antioxidant is a phenol base antioxidant.

19. A hot melt adhesive composition comprising 100 parts by weight of an epoxy-modified block copolymer having an epoxy equivalent of 200 to 5,000, 50 to 150 parts by weight of a paraffin wax having a melting point of 40 to 100° C., 100 to 300 parts by weight of a hydrogenated petroleum resin and 5 to 15 parts by weight of an antioxidant.

20. The hot melt adhesive composition as described in claim 1, wherein the melt viscosity of the hot melt adhesive composition at 180° C. is 500 to 3,500 cps.

21. A hot melt adhesive composition comprising an epoxy-modified block copolymer, a paraffin wax, a tackifier and an antioxidant and having a melt viscosity of 500 to 3,500 cps at 180° C., wherein in a test piece obtained by pressing a paper base material at a load of 2 kg for 2 seconds on a kraft paper on which the hot melt adhesive composition is applied on conditions of an applying temperature of 180° C. and a coated amount of 3 g/m, a heat resistant temperature at which one kraft paper falls off when a temperature is elevated while applying a load of 100 gf/25 mm on the other kraft paper is 65 to 85° C.

22. A hot melt adhesive composition comprising an epoxy-modified block copolymer, a paraffin wax, a tackifier and an antioxidant and having a melt viscosity of 500 to 3,500 cps at 180° C., wherein a test piece obtained by applying the hot melt adhesive composition on a kraft paper in the form of a line on conditions of an applying temperature of 180° C. and a coated amount of 3 g/m and pressing at a load of 2 kg for 2 seconds is cured for one hour in an atmosphere of −20° C., and when the kraft paper is peeled off in an atmosphere of −20° C., the paper surface is broken.

* * * * *